United States Patent
Xiao (10) Patent No.: US 10,884,771 B2
(45) Date of Patent: Jan. 5, 2021

(54) METHOD AND DEVICE FOR DISPLAYING MULTI-LANGUAGE TYPESETTING, BROWSER, TERMINAL AND COMPUTER READABLE STORAGE MEDIUM

(71) Applicant: BEIJING BAIDU NETCOM SCIENCE AND TECHNOLOGY CO., LTD., Beijing (CN)

(72) Inventor: Qiugen Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 157 days.

(21) Appl. No.: 16/237,262

(22) Filed: Dec. 31, 2018

(65) Prior Publication Data

US 2019/0227823 A1 Jul. 25, 2019

(30) Foreign Application Priority Data

Jan. 22, 2018 (CN) .......................... 2018 1 0061020

(51) Int. Cl.
*G06F 17/27* (2006.01)
*G06F 9/451* (2018.01)
(Continued)

(52) U.S. Cl.
CPC ............ *G06F 9/454* (2018.02); *G06F 40/103* (2020.01); *G06F 40/129* (2020.01);
(Continued)

(58) Field of Classification Search
CPC .... G06F 40/186; G06F 16/9577; G06F 40/14; G06F 40/106; G06F 40/109;
(Continued)

(56) References Cited

U.S. PATENT DOCUMENTS 6,115,686 A * 9/2000 Chung .................... G10L 13/08
704/260
6,934,908 B2 * 8/2005 Fox ..................... G06F 16/9577
715/234

(Continued)

FOREIGN PATENT DOCUMENTS

JP          2003091344 A      3/2003
JP       WO2015056384 A1     3/2017

OTHER PUBLICATIONS

European Patent Application No. 18215235.5 extended Search and Opinion dated Jun. 14, 2019, 13 pages.
(Continued)

*Primary Examiner* — Vijay B Chawan
(74) *Attorney, Agent, or Firm* — Lathrop GPM LLP (57) ABSTRACT

The present disclosure provides a method and a device for displaying multi-language typesetting, a browser, a terminal and a computer readable storage medium. The method includes: obtaining a text to be typeset; identifying embedded language content in a principal language text of the text to be typeset, wherein the embedded language content comprises at least one non-principal language content embedded in the principal language text; determining replacement content of the embedded language content, wherein the replacement content comprises a principal language text corresponding to the embedded language content or an abbreviation of a non-principal language text in the embedded language content; and replacing the embedded language content with the replacement content.

17 Claims, 8 Drawing Sheets

(51) Int. Cl.
*G06F 40/44* (2020.01)
*G06F 40/58* (2020.01)
*G06F 40/103* (2020.01)
*G06F 40/129* (2020.01)
*G06F 40/263* (2020.01)
*G06F 40/279* (2020.01)

(52) U.S. Cl.
CPC .......... *G06F 40/263* (2020.01); *G06F 40/279* (2020.01); *G06F 40/44* (2020.01); *G06F 40/58* (2020.01)

(58) Field of Classification Search
CPC ........ G06F 40/166; G06F 9/454; G06F 16/93; G06F 16/951; G06F 3/0481; G06F 40/174; G06F 40/48; G06F 40/117; G06F 40/131; G06F 40/44; G06F 40/40; G06F 40/263; G06F 40/58; G06F 40/103; G06F 40/279; G06F 40/129; G06K 9/00463; G09G 5/14; G09G 5/246; G09G 5/26; G09G 5/30; G10L 13/08; H04H 60/73
USPC ..... 704/2, 4, 8, 10, 9, 200, 260, 270, 270.1, 704/275, 231, 277; 715/234, 255, 248, 715/265, 703, 711, 738; 726/30
See application file for complete search history.

(56) References Cited

U.S. PATENT DOCUMENTS

| | | | | |
|---|---|---|---|---|
| 7,266,767 | B2* | 9/2007 | Parker | G06F 40/58 715/255 |
| 8,312,390 | B2* | 11/2012 | Fitzpatrick | G06F 3/0481 715/856 |
| 9,779,063 | B1* | 10/2017 | Dykema | G06F 16/5854 |
| 10,122,707 | B2* | 11/2018 | Fork | H04L 63/0807 |
| 10,318,614 | B2* | 6/2019 | Kidambi | G06F 16/258 |
| 10,706,213 | B2* | 7/2020 | Nicholas | G06F 40/106 |
| 2003/0058272 | A1* | 3/2003 | Maeno | G06F 40/263 715/738 |
| 2003/0074481 | A1* | 4/2003 | Fox | G06F 16/9577 719/310 |
| 2004/0148156 | A1* | 7/2004 | Hawkins | G06F 40/295 704/10 |
| 2005/0055198 | A1* | 3/2005 | Xun | G06F 40/47 704/2 |
| 2005/0248790 | A1* | 11/2005 | Ornstein | G06F 40/131 358/1.12 |
| 2005/0251735 | A1* | 11/2005 | Dunietz | G06F 40/14 715/255 |
| 2007/0282664 | A1* | 12/2007 | Monster | G06Q 30/0203 704/200 |
| 2010/0211866 | A1* | 8/2010 | Nicholas | G06F 40/109 715/234 |
| 2010/0318743 | A1* | 12/2010 | Fitzpatrick | G06F 9/454 711/126 |
| 2011/0144972 | A1* | 6/2011 | Koenig | G06F 40/58 704/2 |
| 2013/0073955 | A1* | 3/2013 | Fitzpatrick | G06F 3/0481 715/703 |
| 2013/0097627 | A1* | 4/2013 | Hwang | H04H 60/73 725/25 |
| 2013/0291126 | A1* | 10/2013 | Thomson | G06F 16/94 726/30 |
| 2016/0246763 | A1* | 8/2016 | Higuchi | G06F 3/0481 |
| 2018/0081864 | A1* | 3/2018 | Nicholas | G06F 16/9577 |

OTHER PUBLICATIONS

Saxena, PK et al. "Page Previews", Retrieved from the Internet Jun. 6, 2019; https://www.mediawiki.org/w/index.php?title=Page_Previews &oldid=2688895; 7 pages.

Anonymous: "Internet Protocol"; Retrieved from the Internet Jun. 6, 2019; URL:https://ja.wikipedia.org/w/index.php?title=Internet_Protocol&oldid=66528705; with English abstract; 5 pages.

Korean Patent Application No. 10-2018-0108443 Office Action dated Feb. 12, 2020, 4 pages.

Korean Patent Application No. 10-2018-0108443 English translation of Office Action dated Feb. 12, 2020, 5 pages.

* cited by examiner

METHOD AND DEVICE FOR DISPLAYING MULTI-LANGUAGE TYPESETTING, BROWSER, TERMINAL AND COMPUTER READABLE STORAGE MEDIUM

CROSS-REFERENCE TO RELATED APPLICATIONS

This application claims priority to Chinese Patent Application No. 201810061020.8, filed on Jan. 22, 2018, the entire contents of which are incorporated herein by reference.

TECHNICAL FIELD

The present disclosure relates to the field of information technology, and more particularly, to a method and a device for displaying multi-language typesetting, a browser, a terminal and a computer readable storage medium.

BACKGROUND

At present, in multi-language typesetting texts (such as in Chinese-English mixed typesetting texts), since there is no space between Chinese characters, and there is space between English words and string lengths of the words are different, there are always problems of word spacing distortion in text reading and editing of Chinese-English mixed typesetting, such that the layout is untidy and unattractive, and the front-end display effect of the multi-language typesetting is affected. This issue is even more prominent in mobile applications, because the screen is smaller, and the spacing distortion problem is more prominent, thus negatively affecting users' reading experience.

SUMMARY

Embodiments of the present disclosure provide a method and a device for displaying multi-language typesetting, a browser, a terminal and a computer readable storage medium.

Embodiments of the present disclosure provide a method for displaying multi-language typesetting, including: obtaining a text to be typeset; identifying embedded language content in a principal language text of the text to be typeset, wherein the embedded language content includes at least one non-principal language content embedded in the principal language text; determining replacement content of the embedded language content, in which the replacement content includes a principal language text corresponding to the embedded language content or an abbreviation of a non-principal language text in the embedded language content; and replacing the embedded language content with the replacement content.

Embodiments of the present disclosure provide a browser. The browser includes a terminal. The terminal includes one or more processors and a storage device. The storage device is configured to store one or more programs. When the one or more programs are executed by the one or more processors, the one or more processors implement the method for display multi-language typesetting according to embodiments of the present disclosure.

Embodiments of the present disclosure provide a terminal. The terminal includes one or more processors and a storage device. The storage device is configured to store one or more programs. When the one or more programs are executed by the one or more processors, the one or more processors implement the method for display multi-language typesetting according to embodiments of the present disclosure.

Embodiments of the present disclosure provide a computer readable storage medium storing computer programs therein. When the programs are executed by a processor, the method according to the first aspect of the present disclosure is implemented.

The above summary is for the purpose of illustration only and is not intended to limit the present disclosure. In addition to illustrative aspects, embodiments, and features described above, the further aspects, embodiments and features of the present disclosure will be apparent from the description and appended claims.

BRIEF DESCRIPTION OF THE DRAWINGS

In drawings, unless otherwise stated, the same reference numerals throughout the drawings refer to the same or similar parts or elements. The drawings may not be necessarily drawn to scale. It should be understood that, the drawings are merely illustrative of some embodiments of the present disclosure, and should not be construed to limit the scope of the present disclosure.

DETAILED DESCRIPTION

Exemplary embodiments of the present disclosure will be briefly described below. It should be understood by those skilled in the art that, the described embodiments may be modified in various different ways without departing from the spirit or scope of the present disclosure. Therefore, the accompanying drawings and description should be regarded to be illustrative rather than restrictive.

Figure 1:
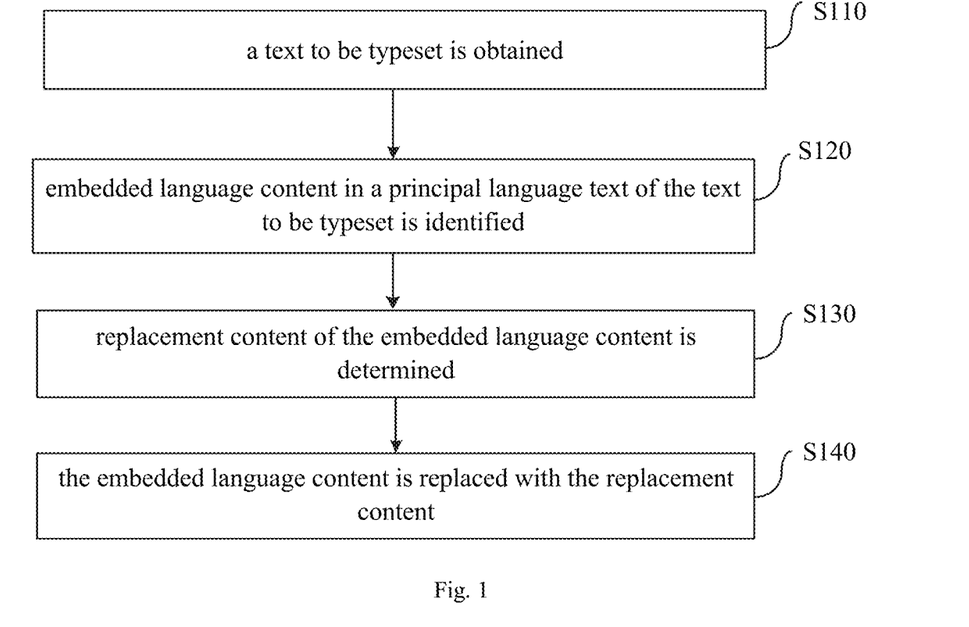
FIG. 1 is a flow chart of a method for displaying multi-language typesetting according to an embodiment of the present disclosure.

Embodiments of the present disclosure provide a method for displaying multi-language typesetting. FIG. 1 is a flow chart of a method for displaying multi-language typesetting according to an embodiment of the present disclosure. As illustrated in FIG. 1, the method includes followings.

At block S110, a text to be typeset is obtained.

At block S120, embedded language content in a principal language text of the text to be typeset is identified. The embedded language content includes at least one non-principal language content embedded in the principal language text.

At block S130, replacement content of the embedded language content is determined. The replacement content includes a principal language text corresponding to the embedded language content or an abbreviation of a non-principal language text in the embedded language content.

At block S140, the embedded language content is replaced with the replacement content.

The embedded language content includes a first word pair, a second word pair, or a separate non-principal language text. The first word pair is composed of a non-principal language text and a principal language text corresponding to the non-principal language text. The second word pair is composed of an abbreviation of the non-principal language text and a full name of the non-principal language text. The separate non-principal language text is an independently existing non-principal language text that does not form a word pair. The replacement content includes page adaptation content corresponding to the embedded language content, including the principal language text or the abbreviation of the non-principal language text.

In multi-language typesetting texts, mother tongue or native language is usually the principal, so it is called the principal language. In many cases, at least one other language may be embedded in the principal language, for example, English is embedded in Chinese, and the other language embedded in the principal language is called as the embedded language. In other words, the language used in the principal language text is different from that used in the embedded language text. Since there are problems of word spacing distortion in typesetting of multi-language typesetting texts, the layout is untidy and unattractive, and the front-end display effect of the multi-language typesetting is affected. Especially in mobile applications, since the screen is small, word spacing distortion is more obvious, reading experience of users is affected, and immersive state of user's concentration and satisfaction in the current target situation (created by the designer) is destroyed.

Figure 2:
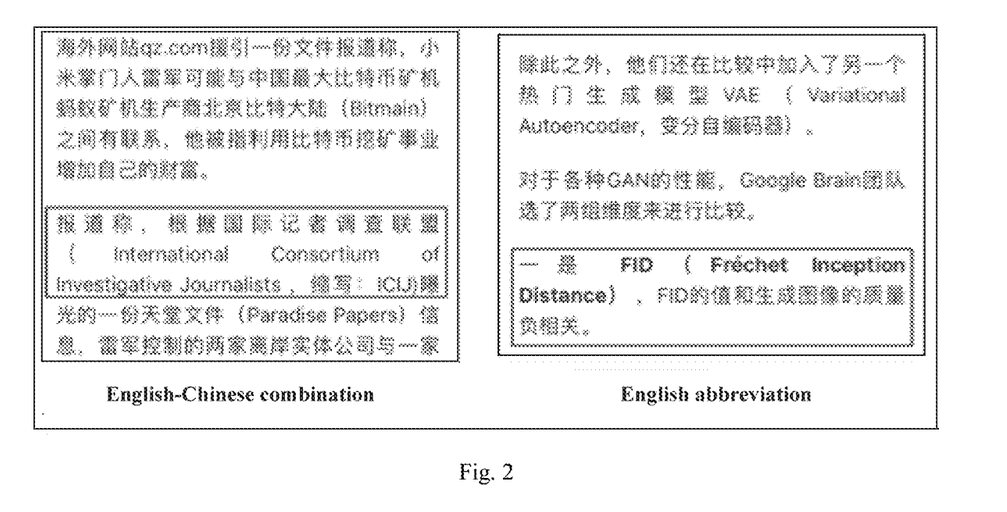
FIG. 2 is a schematic diagram illustrating a page in which word spacing distortion occurs in a multi-language typesetting text in the related art.

FIG. 2 is a schematic diagram illustrating a page in which word spacing distortion occurs in a multi-language typesetting text in the related art. As illustrated in FIG. 2, word spacing distortion occurs in English in the rectangle. The left rectangle illustrates a case where there is the first word pair in the principle language text, the non-principle language text "International Consortium of Investigative Journalists" and its corresponding principle language text "国际记者调查联盟" (Chinese characters, which means the International Consortium of Investigative Journalists) form the first word pair. The right rectangle illustrates a case where there is the second word pair in the principle language text, the abbreviation "FID" and the full name "Frechet Inception Distance" of the non-principle language text form the second word pair.

In an embodiment of the present disclosure, in order to solve problems of word spacing distortion, the embedded language content is replaced with the corresponding page adaptation content, the page adaptation content is the display content adapted to front-end display of the principle language, i.e., the embedded language content is replaced with the corresponding principle language text or the abbreviation of the non-principle language text. For example, in a Chinese-English mixed text, English words having different lengths are replaced with corresponding Chinese characters or English abbreviations. Therefore, word spacing distortion in the front-end display of the multi-language typesetting can be avoided, the page display can more neat and beautiful, and the user experience can be improved.

Figure 3:
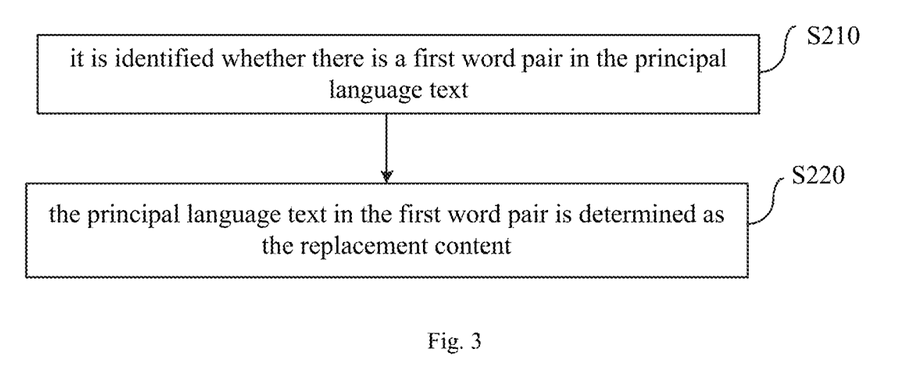
FIG. 3 is a flow chart of a method for displaying multi-language typesetting according to an embodiment of the present disclosure.

FIG. 3 is a flow chart of a method for displaying multi-language typesetting according to an embodiment of the present disclosure. As illustrated in FIG. 3, according to an implementation of the method for displaying multi-language typesetting of the present disclosure, identifying the embedded language content in the principal language text of the text to be typeset may include block S210. At block S210, it is identified whether there is a first word pair in the principal language text. The first word pair is composed of a non-principal language text and a principal language text corresponding to the non-principal language text. Determining the replacement content of the embedded language content may include block S220. At block S220, the principal language text in the first word pair is determined as the replacement content.

Figure 4:
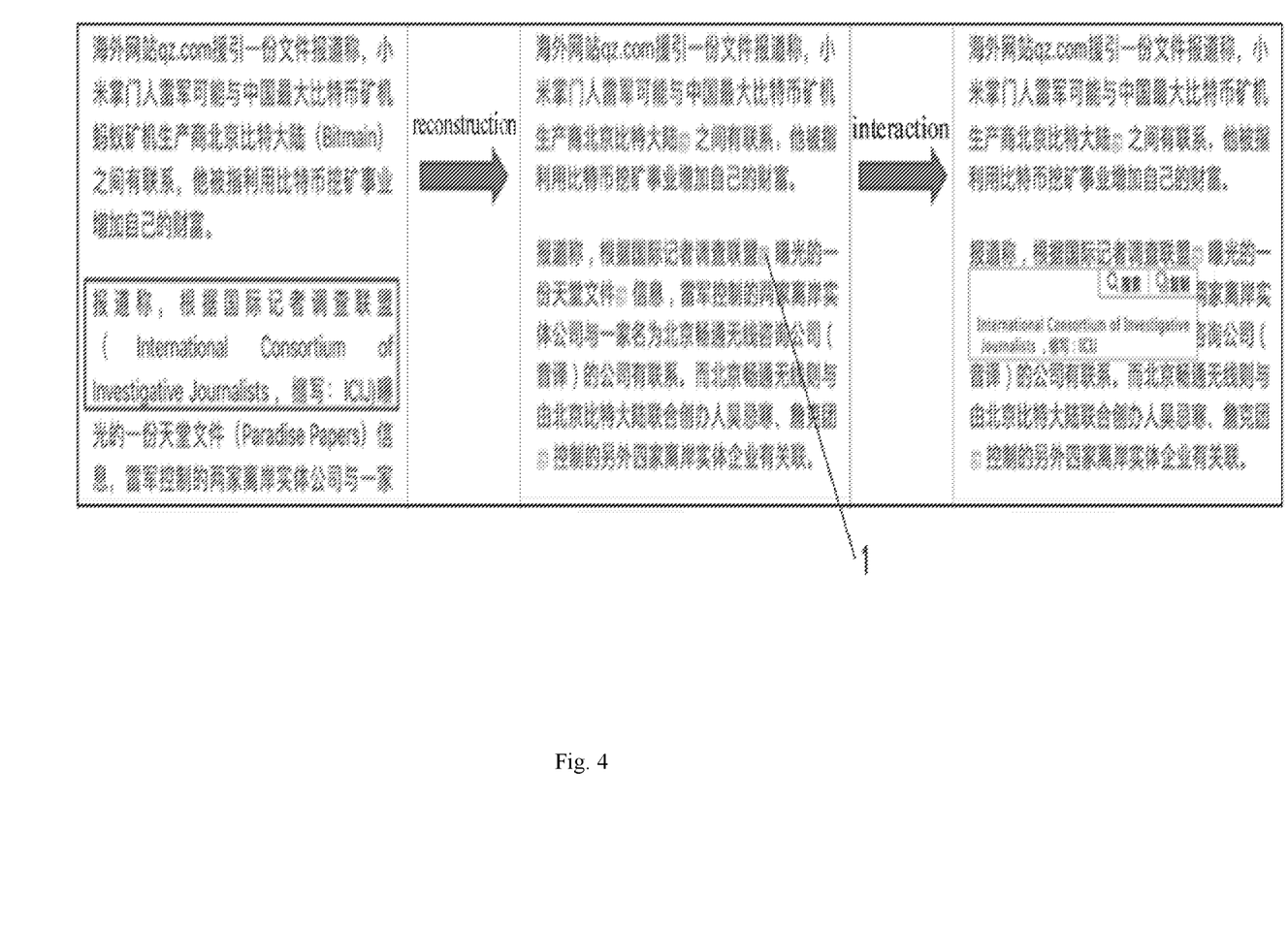
FIG. 4 is a schematic diagram illustrating a reconstruction and interaction effect of a first word pair of a method for displaying multi-language typesetting according to an embodiment of the present disclosure.

FIG. 4 is a schematic diagram illustrating a reconstruction and interaction effect of a first word pair of a method for displaying multi-language typesetting according to an embodiment of the present disclosure. As illustrated in FIG. 4, after reconstruction, in the first word pair, only the principle language text "国际记者调查联盟" (Chinese characters, which means the International Consortium of Investigative Journalists) is retained, and its corresponding non-principle language text "International Consortium of Investigative Journalists" is hidden. Moreover, a prompt mark 1 is set behind the principle language text "国际记者调查联盟" (Chinese characters, which means the International Consortium of Investigative Journalists), indicating that there is hidden content to be viewed.

According to an implementation of the method for displaying multi-language typesetting of the present disclosure, identifying whether there is the first word pair in the principal language text includes: identifying the non-principal language text in the principal language text, and identifying through translation whether the non-principal language text forms the first word pair with its adjacent principal language text. Taking an English-Chinese mixed text as an example, in general cases, the English text and its corresponding Chinese text forming the first word pair may be adjacent texts, and generally the Chinese text is in front, and the English text is in parentheses immediately following the Chinese text. Therefore, identification of Chinese-English word pairs can be assisted by identification symbols (including parentheses, brackets, braces, or dashes, etc.).

Figure 5:
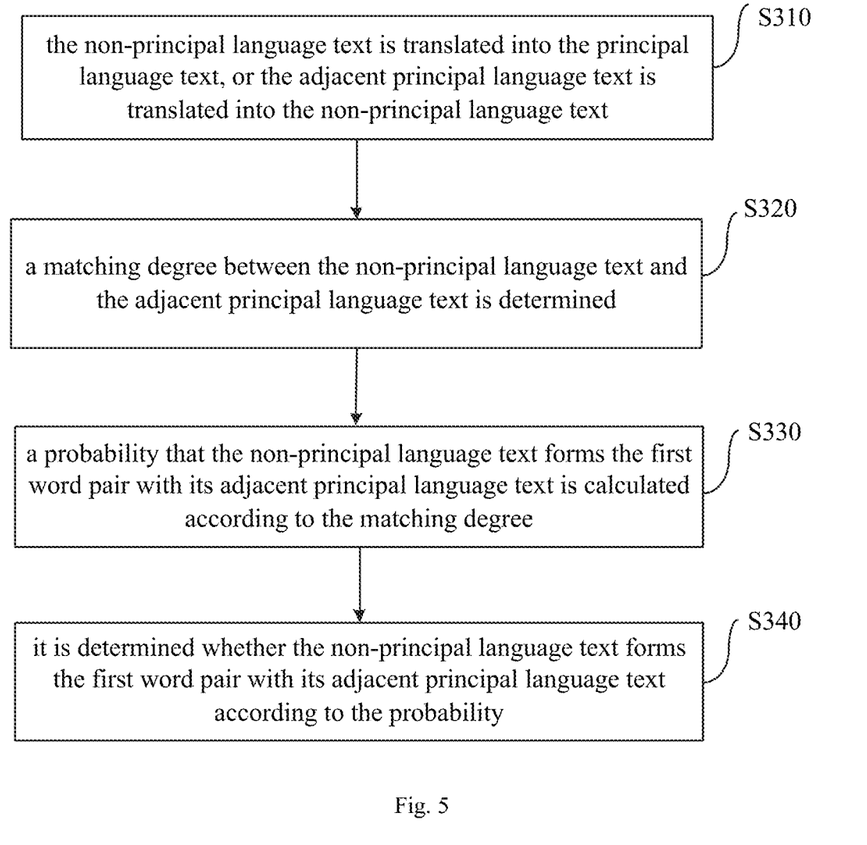
FIG. 5 is a flow chart of identifying a first word pair of a method for displaying multi-language typesetting according to an embodiment of the present disclosure.

FIG. 5 is a flow chart of identifying a first word pair of a method for displaying multi-language typesetting according to an embodiment of the present disclosure. As illustrated in FIG. 5, according to an implementation of the method for displaying multi-language typesetting of the present disclosure, identifying through translation whether the non-principal language text forms the first word pair with its adjacent principal language text may include blocks S310-S340. At block S310, the non-principal language text is translated into the principal language text, or the adjacent principal language text is translated into the non-principal language text. At block S320, a matching degree between the non-principal language text and the adjacent principal language text is determined. The matching degree includes editing distance data determined based on a translation result, a similarity of word vectors, and/or the number of co-occurrences in the text. At block S330, a probability that the non-principal language text forms the first word pair with its adjacent principal language text is calculated according to the matching degree. At block S340, it is determined whether the non-principal language text forms the first word pair with its adjacent principal language text according to the probability.

In the implementation, English is translated into Chinese or Chinese is translated into English, and a possibility of the two forming a Chinese-English word pair is calculated. In a technical implementation, it can be implemented by translating into the same language, and by determining according to features such as the editing distance, the similarity of word vectors, and the number of co-occurrences in the text.

The word vector is a way to mathematicalize words in the language, because to process natural language using the algorithm in machine learning, it is usually necessary to mathematicalize the language first. For example, a simple way of the word vector is to represent a word with a long vector, the length of the vector is the size of the dictionary, components of the vector may only have one 1, and the rest are 0. The position of 1 corresponds to the position of the word in the dictionary. The corpus can be used to train the word vector model, to calculate the word similarity.

In the implementation, the features (including editing distance data, the similarity of word vectors, and/or the number of co-occurrences in the text) may be combined, and identification of word pairs can be performed using the machine learning model and based on the above features.

According to an implementation of the method for displaying multi-language typesetting of the present disclosure, the editing distance data includes an editing distance between the translated text and the adjacent text, or a ratio of the editing distance to a length of the translated text. The editing distance refers to the minimum number of editing operations required to convert from one to the other between two strings, and allowable editing operations may include replacing one character with the other, inserting a character, and deleting a character. In general, the smaller the editing distance is, the greater the similarity between the two strings is. In the implementation, the determination model may be not limited, it may be determined by calculating a probability of the two being a Chinese-English word pair according to the editing distance, or by calculating a similarity using a regression model according to an extended feature (such as the ratio of the editing distance to the length of the original fragment). It may not be very accurate to determine the matching degree of two words merely using the editing distance, in some cases, the editing distance is large because the length of the text is large, rather than the similarity is low. By taking the ratio of the editing distance to the length of the translated text as the matching degree between the non-principle language text and the adjacent principle language text, the accuracy of word pair determination can be further improved.

According to an implementation of the method for displaying multi-language typesetting of the present disclosure, identifying through translation whether the non-principal language text forms the first word pair with its adjacent principal language text includes: identifying whether the non-principal language text forms the first word pair with its adjacent principal language text according to machine translation corpus and by using a neural network machine model. In the implementation, the similarity between Chinese and English can directly be learned using a neural network, and a text alignment relationship can be mined through machine translation corpus. Bilingual text alignment is to establish a correspondence between the same language unit of source language and target language in bilingual corpus, that is, to determine a translation relationship between language unit(s) in the source language text and language unit(s) in the target language text. The source language fragment and the target language sequence are taken as input in the learning mode of the neural network, to fit the corresponding similarity.

Figure 6:
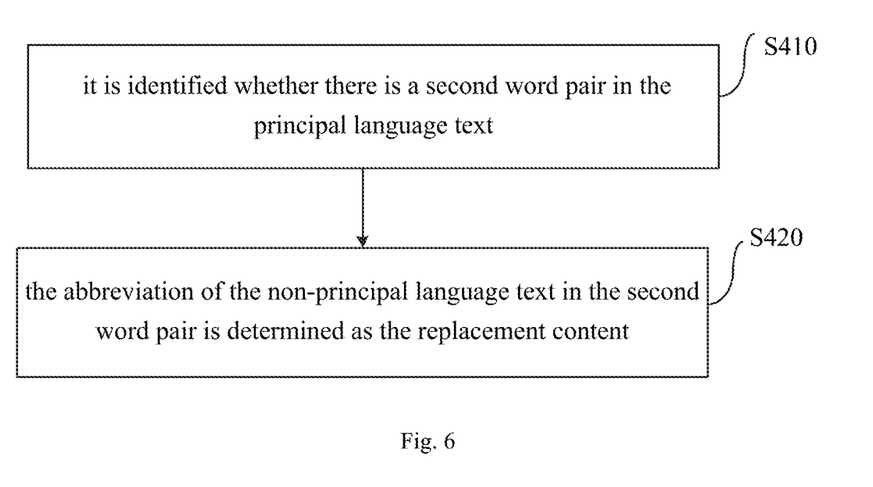
FIG. 6 is a flow chart of a method for displaying multi-language typesetting according to another embodiment of the present disclosure.

FIG. 6 is a flow chart of a method for displaying multi-language typesetting according to another embodiment of the present disclosure. As illustrated in FIG. 6, according to an implementation of the method for displaying multi-language typesetting of the present disclosure, identifying the embedded language content in the principal language text of the text to be typeset may further include block S410. At block S410, it is identified whether there is a second word pair in the principal language text. The second word pair is composed of the abbreviation of the non-principal language text and a full name of the non-principal language text. Determining the replacement content of the embedded language content may further include block S420. At block S420, the abbreviation of the non-principal language text in the second word pair is determined as the replacement content.

Figure 7:
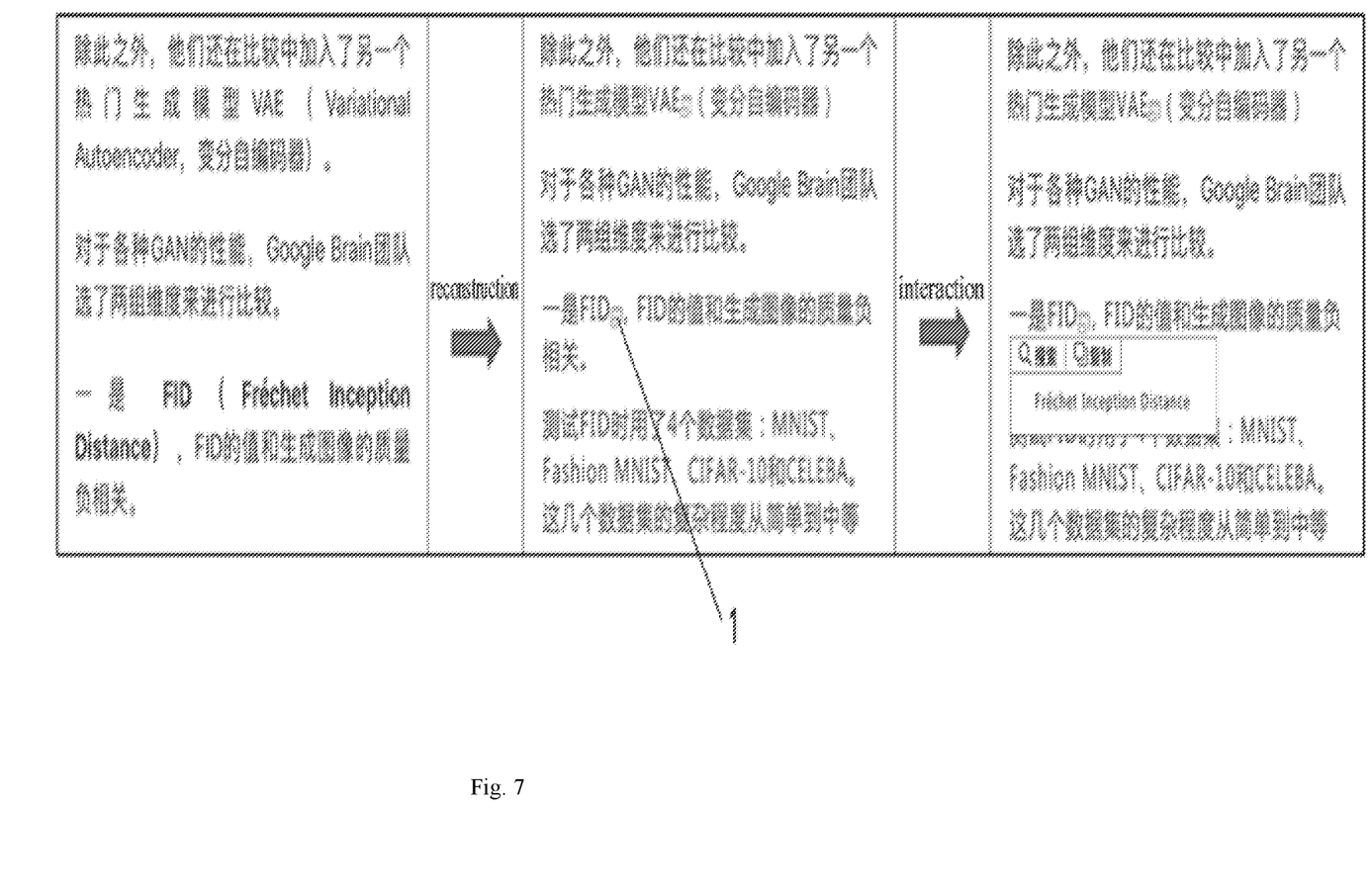
FIG. 7 is a schematic diagram illustrating a reconstruction and interaction effect of a second word pair of a method for displaying multi-language typesetting according to an embodiment of the present disclosure.

FIG. 7 is a schematic diagram illustrating a reconstruction and interaction effect of a second word pair of a method for displaying multi-language typesetting according to an embodiment of the present disclosure. As illustrated in FIG. 7, after reconstruction, in the second word pair, only the abbreviation "FID" of the non-principal language text is retained, and its corresponding full name "Frechet Inception Distance" is hidden. Moreover, a prompt mark 1 is set behind the abbreviation "FID" of the non-principal language text, indicating that there is hidden content to be viewed.

According to an implementation of the method for displaying multi-language typesetting of the present disclosure, identifying whether there is the second word pair in the principal language text includes: identifying the non-principal language text in the principal language text, and determining whether the non-principal language text belongs to the second word pair according to an initial letter. Taking an English-Chinese mixed text as an example, in the second word pair composed by the abbreviation and the full name of the non-principal language text, the abbreviation of the non-principal language text is generally in front, and the full name of the non-principle language text is in parentheses immediately following the abbreviation. Therefore, identification of the abbreviation and the full name of the non-principal language text can be assisted by identification symbols (including parentheses, brackets, braces, or dashes, etc.).

Figure 8:
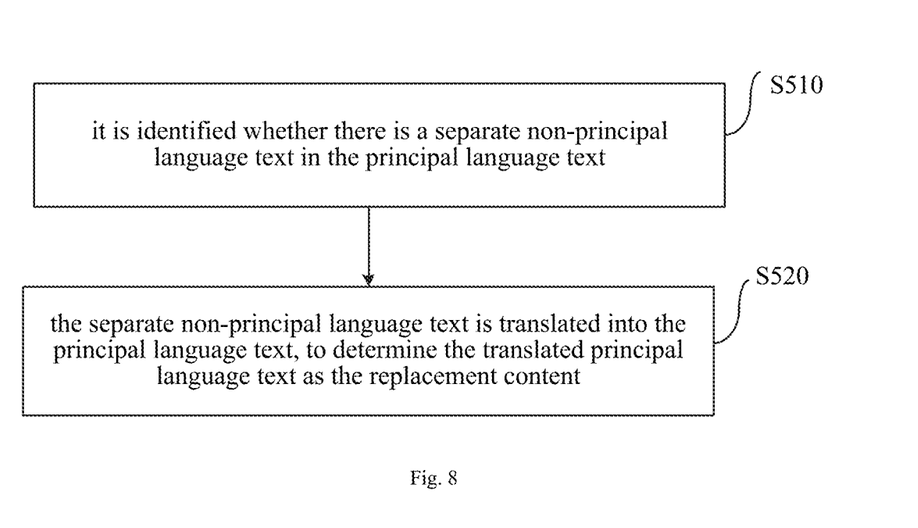
FIG. 8 is a flow chart of a method for displaying multi-language typesetting according to yet another embodiment of the present disclosure.

FIG. 8 is a flow chart of a method for displaying multi-language typesetting according to yet another embodiment of the present disclosure. As illustrated in FIG. 8, according to an implementation of the method for displaying multi-language typesetting of the present disclosure, identifying the embedded language content in the principal language text of the text to be typeset may further include block S510. At block S510, it is identified whether there is a separate non-principal language text in the principal language text.

The separate non-principal language text is an independently existing non-principal language text that does not form a word pair. Determining the replacement content of the embedded language content may further include S520. At block S520, the separate non-principal language text is translated into the principal language text, to determine the translated principal language text as the replacement content. In the implementation, when the embedded language content is not in the word pair form, but is the non-principal language text existed independently, the embedded language content is directly replaced with the corresponding translated principal language text.

Figure 9:
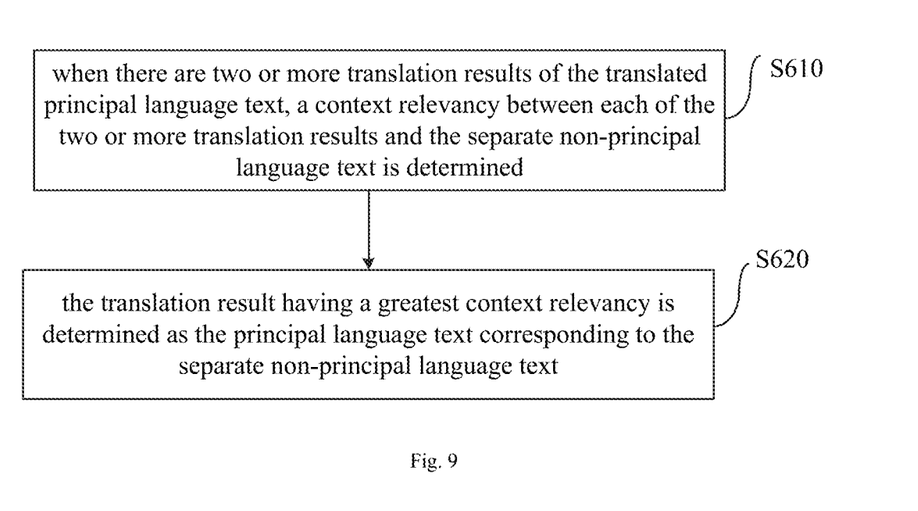
FIG. 9 is a flow chart of replacing of a separate non-principal language text of a method for displaying multi-language typesetting according to an embodiment of the present disclosure.

FIG. 9 is a flow chart of replacing of a separate non-principal language text of a method for displaying multi-language typesetting according to an embodiment of the present disclosure. As illustrated in FIG. 9, according to an implementation of the method for displaying multi-language typesetting of the present disclosure, determining the replacement content of the embedded language content further include block S620 and block S630. At block S620, when there are two or more translation results of the translated principal language text, a context relevancy between each of the two or more translation results and the separate non-principal language text is determined. At block S630, the translation result having a greatest context relevancy is determined as the principal language text corresponding to the separate non-principal language text.

In the implementation, English is translated into Chinese, and disambiguation is performed. For example, an English word may have different Chinese translation results (for example, UPS may be an abbreviation of "Uninterrupted Power Supply", and may also be the abbreviation of "University of Paris-Sud"), by determining the context relevancy between each of the different translation results and the context to eliminate disambiguation, consistency of the sentence meaning can be ensured, and possibility of escaping can be reduced.

According to an implementation of the method for displaying multi-language typesetting of the present disclosure, after the embedded language content is replaced with the replacement content, the method further includes: setting a prompt mark for the replacement content, and displaying the embedded language content corresponding to the replacement content in response to a preset operation. The prompt mark includes a preset font of the replacement content and/or a preset mark symbol of the replacement content. The preset operation includes clicking or long pressing the page adaptation content or the mark symbol.

In the implementation, based on dynamic interaction of the front-end technology, APP floating layer control or javascript script developed by HTML (HyperText Markup Language) is called to complete front-end interaction, achieving the display effect of displaying English information corresponding to the Chinese in response to the clicking or long pressing operation.

In FIG. 4, the prompt mark 1 is set behind the principle language text "国际记者调查联盟" (Chinese characters, which means the International Consortium of Investigative Journalists), and in FIG. 7, the prompt mark 1 is set behind the abbreviation "FID" of the non-principle language text, indicating that there is the hidden content to be viewed, the hidden embedded non-principle language content can be displayed by clicking or long pressing the prompt mark 1. FIG. 4 and FIG. 7 also illustrate the page effect after interaction. In addition, the prompt mark may also be the preset font of the page adaptation content, such as a font color prompt, an italic prompt or an underline font prompt, or a combination of multiple font styles to play a prominent reminder, the hidden embedded non-principle language content can be displayed by clicking or long pressing the text having the prompt mark font. In embodiments of the present disclosure, the word spacing distortion in front-end display of multi-language typesetting can be avoided, complete multi-language content can be displayed, the page display can be more neat and beautiful, and user experience can be improved.

Figure 10:
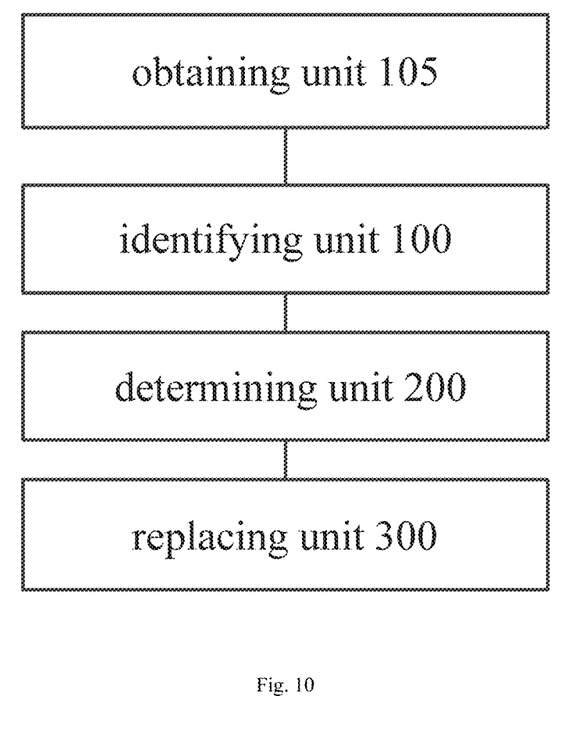
FIG. 10 is a block diagram of a device for displaying multi-language typesetting according to an embodiment of the present disclosure.

According to another aspect, embodiments of the present disclosure provide a device for displaying multi-language typesetting. FIG. 10 is a block diagram of a device for displaying multi-language typesetting according to an embodiment of the present disclosure. As illustrated in FIG. 10, the device includes an obtaining unit 105, an identifying unit 100, a determining unit 200 and a replacing unit 300.

The obtaining unit 105 is configured to obtain a text to be typeset.

The identifying unit 100 is configured to identify embedded language content in a principal language text of the text to be typeset. The embedded language content includes at least one non-principal language content embedded in the principal language text.

The determining unit 200 is configured to determine replacement content of the embedded language content. The replacement content includes a principal language text corresponding to the embedded language content or an abbreviation of a non-principal language text in the embedded language content.

The replacing unit 300 is configured to replace the embedded language content with the replacement content.

The embedded language content includes a first word pair, a second word pair, or a separate non-principal language text. The first word pair is composed of a non-principal language text and a principal language text corresponding to the non-principal language text. The second word pair is composed of an abbreviation of the non-principal language text and a full name of the non-principal language text. The separate non-principal language text is an independently existing non-principal language text that does not form a word pair. The replacement content includes page adaptation content corresponding to the embedded language content, and the page adaptation content includes the principal language text or the abbreviation of the non-principal language text.

Figure 11:
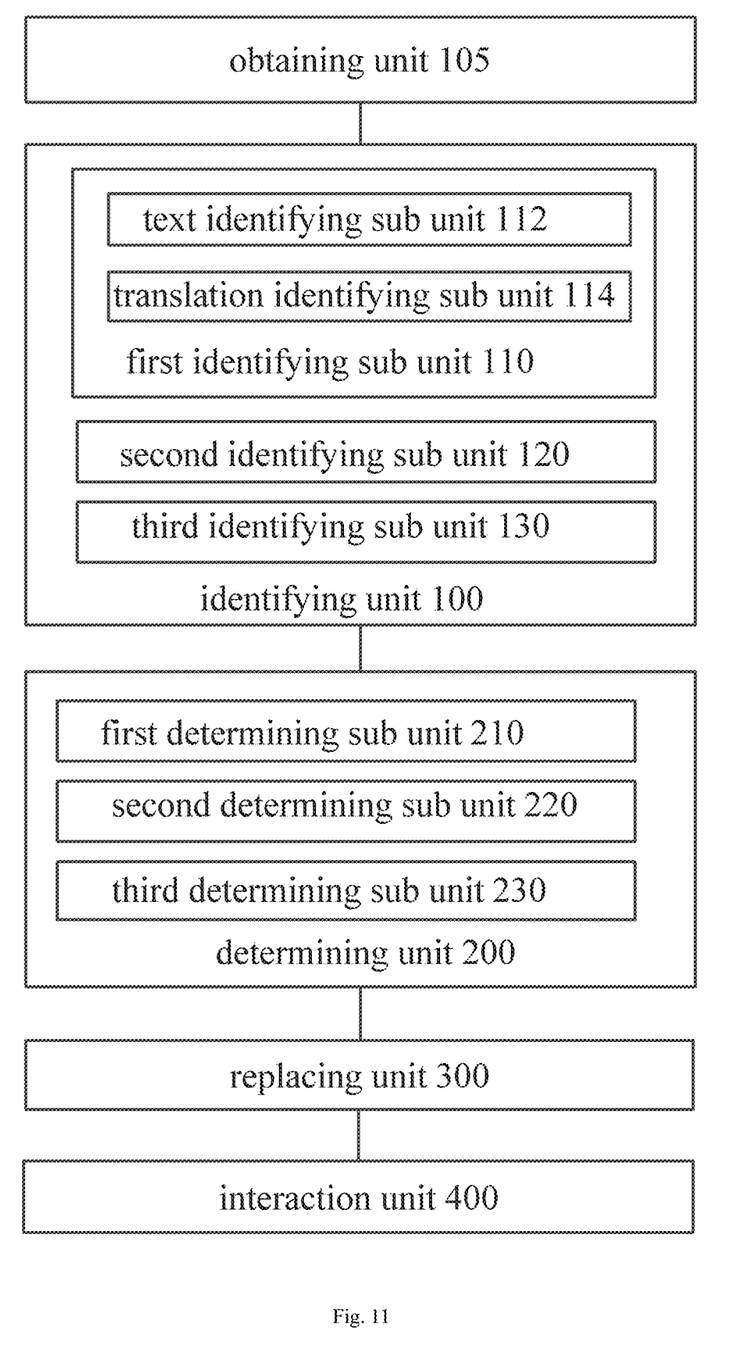
FIG. 11 is a block diagram of a device for displaying multi-language typesetting according to another embodiment of the present disclosure.

FIG. 11 is a block diagram of a device for displaying multi-language typesetting according to another embodiment of the present disclosure. As illustrated in FIG. 11, the identifying unit 100 includes a first identifying sub unit 110. The first identifying sub unit 110 is configured to identify whether there is a first word pair in the principal language text. The first word pair is composed of a non-principal language text and a principal language text corresponding to the non-principal language text. The determining unit 200 includes a first determining sub unit 210. The first determining sub unit 210 is configured to determine the principal language text in the first word pair as the replacement content.

According to an implementation of the device for displaying multi-language typesetting of the present disclosure, the first identifying sub unit 110 includes a text identifying sub unit 112 and a translation identifying sub unit 114. The text identifying sub unit 112 is configured to identify the non-principal language text in the principal language text. The translation identifying sub unit 114 is configured to identify through translation whether the non-principal language text forms the first word pair with its adjacent principal language text.

According to an implementation of the device for displaying multi-language typesetting of the present disclosure, the translation identifying sub unit 114 is further configured to: translate the non-principal language text into the principal language text, or translate the adjacent principal language text into the non-principal language text; determine a matching degree between the non-principal language text and the adjacent principal language text, in which the matching degree includes editing distance data determined based on a translation result, a similarity of word vectors, and/or the number of co-occurrences in the text; calculate a probability that the non-principal language text forms the first word pair with its adjacent principal language text according to the matching degree; and determine whether the non-principal language text forms the first word pair with its adjacent principal language text according to the probability.

In the implementation, the features (including editing distance data, the similarity of word vectors, and/or the number of co-occurrences in the text) may be combined, and identification of word pairs can be performed using the machine learning model and based on the above features.

According to an implementation of the device for displaying multi-language typesetting of the present disclosure, the editing distance data includes an editing distance between the translated text and the adjacent text, or a ratio of the editing distance to a length of the translated text.

According to an implementation of the device for displaying multi-language typesetting of the present disclosure, the translation identifying sub unit 114 is further configured to identify whether the non-principal language text forms the first word pair with its adjacent principal language text according to machine translation corpus and by using a neural network machine model.

According to an implementation of the device for displaying multi-language typesetting of the present disclosure, the identifying unit 100 includes a second identifying sub unit 120. The second identifying sub unit 120 is configured to identify whether there is a second word pair in the principal language text. The second word pair is composed of the abbreviation of the non-principal language text and a full name of the non-principal language text. The determining unit 200 includes a second determining sub unit 220. The second determining sub unit 220 is configured to determine the abbreviation of the non-principal language text in the second word pair as the replacement content.

According to an implementation of the device for displaying multi-language typesetting of the present disclosure, the second identifying sub unit 120 is further configured to identify the non-principal language text in the principal language text, and determine whether the non-principal language text belongs to the second word pair according to an initial letter.

According to an implementation of the device for displaying multi-language typesetting of the present disclosure, the identifying unit 100 includes a third identifying sub unit 130. The third identifying sub unit 130 is configured to identify whether there is a separate non-principal language text in the principal language text. The separate non-principal language text is an independently existing non-principal language text that does not form a word pair. The determining unit 200 includes a third determining sub unit 230. The third determining sub unit 230 is configured to translate the separate non-principal language text into the principal language text, to determine the translated principal language text as the replacement content.

According to an implementation of the device for displaying multi-language typesetting of the present disclosure, the third determining sub unit 230 is further configured to: when there are two or more translation results of the translated principal language text, determine a context relevancy between each of the two or more translation results and the separate non-principal language text, and determine the translation result having a greatest context relevancy as the principal language text corresponding to the separate non-principal language text.

According to an implementation of the device for displaying multi-language typesetting of the present disclosure, the device further includes an interaction unit 400. The interaction unit 400 is configured to set a prompt mark for the replacement content, and display the embedded language content corresponding to the replacement content in response to a preset operation. The prompt mark includes a preset font of the replacement content and/or a preset mark symbol of the replacement content. The preset operation includes clicking or long pressing the page adaptation content or the mark symbol.

In a possible implementation, the device for displaying multi-language typesetting includes a processor and a memory. The memory is configured to store programs for supporting the device for displaying multi-language typesetting to perform the method for displaying multi-language typesetting according to the present disclosure, and the processor is configured to execute the programs stored in the memory.

According to another aspect, embodiments of the present disclosure provide a browser. The browser includes the device for display multi-language typesetting according to embodiments of the present disclosure.

According to yet another aspect, embodiments of the present disclosure provide a terminal. The terminal includes one or more processors and a storage device. The storage device is configured to store one or more programs. When the one or more programs are executed by the one or more processors, the one or more processors implement the method according to embodiments of the present disclosure.

According to yet another aspect, embodiments of the present disclosure provide a computer readable storage medium storing computer programs therein. When the programs are executed by a processor, the method according to embodiments the present disclosure is implemented.

The technical solutions of the present disclosure may have following advantages or beneficial effects. The word spacing distortion in front-end display of multi-language typesetting can be avoided, complete multi-language content can be displayed, the page display can be more neat and more beautiful, and user experience can be improved.

The technical solutions of the present disclosure may further have following advantages or beneficial effects. The ratio of the editing distance to the length of the translated text is taken as the matching degree between the non-principle language text and the adjacent principle language text, the accuracy of word pair determination can be further improved.

The technical solutions of the present disclosure may still have following advantages or beneficial effects. The disambiguation process is performed on the translation result, and the context relevancy between each of the two or more translation results and the separate non-principal language text is determined, consistency of the sentence meaning can be ensured, and the possibility of escaping can be reduced.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may include one or more this feature. In the description of the present disclosure, unless it is specified otherwise, "a plurality of" means at least two, for example, two or three.

Any procedure or method described in the flow charts or described in any other way herein may be understood to include one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed. The implementation of the device corresponds to the implementation of the method, and therefore descriptions of the device are relatively simple, and the related description may refer to the description of the implementation of the method.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium. The storage medium mentioned above may be read-only memories, magnetic disks or CD, etc.

The above embodiments illustrate merely specific implementations of the present disclosure, which are described in detail but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. A method for displaying multi-language typesetting, comprising:

obtaining a text to be typeset;

identifying embedded language content in a principal language text of the text to be typeset wherein an embedded language corresponding to the embedded language content is different from a principal language corresponding to the principal language text, and the identifying the embedded language content in the principal language text of the text to be typeset comprises identifying a non-principal language text in the principal language text and identifying through translation whether the non-principal language text forms a first word pair with its adjacent principal language text, wherein the first word pair is composed of a non-principal language text and a principal language text corresponding to the non-principal language text and the embedded language content comprises at least one non-principal language content embedded in the principal language text;

determining replacement content of the embedded language content, wherein the replacement content comprises a principal language text corresponding to the embedded language content or an abbreviation of a non-principal language text in the embedded language content; and replacing the embedded language content with the replacement content;

wherein the identifying through translation whether the non-principal language text forms the first word pair with its adjacent principal language text comprises;

translating the non-principal language text into the principal language text, or translating the adjacent principal language text into the non-principal language text;

determining a matching degree between the non-principal language text and the adjacent principal language text, wherein the matching degree comprises editing distance data determined based on a translation result, a similarity of word vectors, and/or the number of co-occurrences in the text, the editing distance data comprises an editing distance between the translated text and the adjacent text, or a ratio of the editing distance to a length of the translated text;

calculating a probability that the non-principal language text forms the first word pair with its adjacent principal language text according to the matching degree; and determining whether the non-principal language text forms the first word pair with its adjacent principal language text according to the probability.

2. The method according to claim 1, wherein, determining the replacement content of the embedded language content comprises:

determining the principal language text in the first word pair as the replacement content.

3. The method according to claim 2, wherein identifying through translation whether the non-principal language text forms the first word pair with its adjacent principal language text comprises:

identifying whether the non-principal language text forms the first word pair with its adjacent principal language text according to machine translation corpus and by using a neural network machine model.

4. The method according to claim 1, wherein, identifying the embedded language content in the principal language text of the text to be typeset further comprises:

identifying whether there is a second word pair in the principal language text, wherein the second word pair is composed of the abbreviation of the non-principal language text and a full name of the non-principal language text, determining the replacement content of the embedded language content comprises:

determining the abbreviation of the non-principal language text in the second word pair as the replacement content.

5. The method according to claim 4, wherein identifying whether there is the second word pair in the principal language text comprises:

identifying the non-principal language text in the principal language text; and determining whether the non-principal language text belongs to the second word pair according to an initial letter.

6. The method according to claim 1, wherein, identifying the embedded language content in the principal language text of the text to be typeset further comprises:

identifying whether there is a separate non-principal language text in the principal language text, wherein the separate non-principal language text is an independently existing non-principal language text that does not form a word pair;

determining the replacement content of the embedded language content comprises:

translating the separate non-principal language text into the principal language text, to determine the translated principal language text as the replacement content.

7. The method according to claim 6, wherein determining the replacement content of the embedded language content further comprises:

when there are two or more translation results of the translated principal language text, determining a context relevancy between each of the two or more translation results and the separate non-principal language text; and determining the translation result having a greatest context relevancy as the principal language text corresponding to the separate non-principal language text.

8. The method according to claim 1, after replacing the embedded language content with the replacement content, further comprising:

setting a prompt mark for the replacement content, the prompt mark comprising a preset font of the replacement content and/or a preset mark symbol of the replacement content; and displaying the embedded language content corresponding to the replacement content in response to a preset operation.

9. A terminal, comprising:

one or more processors;

a storage device, configured to store one or more programs;

wherein when the one or more programs are executed by the one or more processors, the one or more processors are configured to:

obtain a text to be typeset;

identify embedded language content in a principal language text of the text to be typeset wherein an embedded language corresponding to the embedded language content is different from a principal language corresponding to the principal language text, and the identifying the embedded language content in the principal language text of the text to be typeset comprises identifying a non-principal language text in the principal language text and identifying through translation whether the non-principal language text forms a first word pair with its adjacent principal language text, wherein the first word pair is composed of a non-principal language text and a principal language text corresponding to the non-principal language text and the embedded language content comprises at least one non-principal language content embedded in the principal language text;

determine replacement content of the embedded language content, wherein the replacement content comprises a principal language text corresponding to the embedded language content or an abbreviation of a non-principal language text in the embedded language content; and replace the embedded language content with the replacement content;

wherein the identifying through translation whether the non-principal language text forms the first word pair with its adjacent principal language text comprises:

translating the non-principal language text into the principal language text, or translating the adjacent principal language text into the non-principal language text;

determining a matching degree between the non-principal language text and the adjacent principal language text, wherein the matching degree comprises editing distance data determined based on a translation result, a similarity of word vectors, and/or the number of co-occurrences in the text, the editing distance data comprises an editing distance between the translated text and the adjacent text, or a ratio of the editing distance to a length of the translated text;

calculating a probability that the non-principal language text forms the first word pair with its adjacent principal language text according to the matching degree; and determining whether the non-principal language text forms the first word pair with its adjacent principal language text according to the probability.

10. The terminal according to claim 9, wherein when the one or more processors are configured to identify the embedded language content in the principal language text of the text to be typeset, the one or more processors are configured to:

determine the principal language text in the first word pair as the replacement content.

11. The terminal according to claim 10, wherein when the one or more processors are configured to identify through translation whether the non-principal language text forms the first word pair with its adjacent principal language text, the one or more processors are configured to:

identify whether the non-principal language text forms the first word pair with its adjacent principal language text according to machine translation corpus and by using a neural network machine model.

12. The terminal according to claim 9, wherein when the one or more processors are configured to identify the embedded language content in the principal language text of the text to be typeset, the one or more processors are configured to:

identify whether there is a second word pair in the principal language text, wherein the second word pair is composed of the abbreviation of the non-principal language text and a full name of the non-principal language text; and determine the abbreviation of the non-principal language text in the second word pair as the replacement content.

13. The terminal according to claim 12, wherein when the one or more processors are configured to identify whether there is the second word pair in the principal language text, the one or more processors are configured to:

identify the non-principal language text in the principal language text; and determine whether the non-principal language text belongs to the second word pair according to an initial letter.

14. The terminal according to claim 9, wherein when the one or more processors are configured to identify the embedded language content in the principal language text of the text to be typeset, the one or more processors are configured to:

identify whether there is a separate non-principal language text in the principal language text, wherein the separate non-principal language text is an independently existing non-principal language text that does not form a word pair; and translate the separate non-principal language text into the principal language text, to determine the translated principal language text as the replacement content.

15. The terminal according to claim 14, wherein when the one or more processors are configured to determine the replacement content of the embedded language content, the one or more processors are configured to:

when there are two or more translation results of the translated principal language text, determine a context relevancy between each of the two or more translation results and the separate non-principal language text; and determine the translation result having a greatest context relevancy as the principal language text corresponding to the separate non-principal language text.

16. The terminal according to claim 9, wherein the one or more processors are further configured to:

set a prompt mark for the replacement content, the prompt mark comprising a preset font of the replacement content and/or a preset mark symbol of the replacement content; and display the embedded language content corresponding to the replacement content in response to a preset operation.

17. An apparatus, comprising a device for displaying multi-language typesetting, wherein the device comprises:

one or more processors;

a storage device, configured to store one or more programs;

wherein when the one or more programs are executed by the one or more processors, the one or more processors are configured to:

obtain a text to be typeset;

identify embedded language content in a principal language text of the text to be typeset, wherein the embedded language content comprises at least one non-principal language content embedded in the principal language text;

determine replacement content of the embedded language content, wherein an embedded language corresponding to the embedded language content is different from a principal language corresponding to the principal language text, and the identifying the embedded language content in the principal language text of the text to be typeset comprises identifying a non-principal language text in the principal language text and identifying through translation whether the non-principal language text forms a first word pair with its adjacent principal language text, wherein the first word pair is composed of a non-principal language text and a principal language text corresponding to the non-principal language text and the replacement content comprises a principal language text corresponding to the embedded language content or an abbreviation of a non-principal language text in the embedded language content; and replace the embedded language content with the replacement content;

wherein the identifying through translation whether the non-principal language text forms the first word pair with its adjacent principal language text comprises:

translating the non-principal language text into the principal language text, or translating the adjacent principal language text into the non-principal language text;

determining a matching degree between the non-principal language text and the adjacent principal language text, wherein the matching degree comprises editing distance data determined based on a translation result, a similarity of word vectors, and/or the number of co-occurrences in the text, the editing distance data comprises an editing distance between the translated text and the adjacent text, or a ratio of the editing distance to a length of the translated text;

calculating a probability that the non-principal language text forms the first word pair with its adjacent principal language text according to the matching degree; and determining whether the non-principal language text forms the first word pair with its adjacent principal language text according to the probability.

\* \* \* \* \*